(12) United States Patent
Kobayashi

(10) Patent No.: US 12,511,717 B2
(45) Date of Patent: Dec. 30, 2025

(54) IMAGE PROCESSING SYSTEM, MOVABLE APPARATUS, IMAGE PROCESSING METHOD, AND STORAGE MEDIUM

(71) Applicant: CANON KABUSHIKI KAISHA, Tokyo (JP)

(72) Inventor: Keisuke Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/756,762

(22) Filed: Jun. 27, 2024

(65) Prior Publication Data

US 2024/0346626 A1  Oct. 17, 2024

Related U.S. Application Data

(63) Continuation-in-part of application No. PCT/JP2023/001958, filed on Jan. 23, 2023.

(30) Foreign Application Priority Data

Jan. 26, 2022 (JP) ................................ 2022-010443
Jan. 6, 2023 (JP) ................................ 2023-000954

(51) Int. Cl.
*G06T 5/50* (2006.01)
*H04N 13/117* (2018.01)

(52) U.S. Cl.
CPC ............. *G06T 5/50* (2013.01); *H04N 13/117* (2018.05); *G06T 2207/20221* (2013.01)

(58) Field of Classification Search
CPC ...... H04N 13/117; H04N 23/55; H04N 23/90; H04N 23/60; H04N 7/18; G03B 15/00; G03B 37/00; B60R 1/27; B60R 11/02; B60R 99/00; G06T 5/50; G06T 2207/20221

See application file for complete search history.

(56) References Cited

U.S. PATENT DOCUMENTS 10,306,207 B2   5/2019  Matono
10,623,661 B2 * 4/2020  Oh .......................... G06T 11/00
(Continued)

FOREIGN PATENT DOCUMENTS

JP   2008-283527 A   11/2008
JP   2016-018295 A    2/2016
(Continued)

OTHER PUBLICATIONS

Apr. 11, 2023 International Search Report in International Patent Appln. No. PCT/JP2023/001958.

*Primary Examiner* — Vinh T Lam
(74) *Attorney, Agent, or Firm* — Venable LLP

(57) ABSTRACT

An image processing system, which can prevent a sense of resolution when an image obtained by capturing surroundings of a movable apparatus is displayed from deteriorating, includes a first optical system that forms a first optical image having a low-resolution area corresponding to an angle of view less than a first angle of view and a high-resolution area corresponding to an angle of view greater than or equal to the first angle of view, a first imaging unit that captures the first optical image formed by the first optical system to generate first image data, and an image processing unit that deforms the first image data to generate first deformed image data.

16 Claims, 10 Drawing Sheets

(56) References Cited

U.S. PATENT DOCUMENTS

| | | | |
|---|---|---|---|
| 10,957,029 B2* | 3/2021 | Ichihashi | G06T 7/579 |
| 11,143,514 B2* | 10/2021 | Bai | G06T 7/38 |
| 11,159,744 B2 | 10/2021 | Aihara | |
| 11,310,461 B2* | 4/2022 | Aihara | B60R 1/28 |
| 11,321,950 B2* | 5/2022 | Lee | G08G 1/16 |
| 11,358,610 B2 | 6/2022 | Takagi | |
| 11,481,876 B2* | 10/2022 | Liu | G06T 5/50 |
| 11,760,374 B2 | 9/2023 | Takagi | |
| 12,081,863 B2* | 9/2024 | Yamamoto | H04N 23/90 |
| 12,081,880 B2* | 9/2024 | Zhu | G06T 3/4053 |
| 12,196,567 B2* | 1/2025 | Hochman | G06F 18/256 |
| 12,250,494 B2* | 3/2025 | Lee | G06V 20/41 |
| 2017/0180701 A1 | 6/2017 | Matono | |
| 2018/0070023 A1* | 3/2018 | Oh | H04N 5/2625 |
| 2018/0160052 A1* | 6/2018 | Aihara | G02B 3/02 |
| 2018/0338095 A1* | 11/2018 | Aihara | H04N 23/951 |
| 2021/0107506 A1 | 4/2021 | Takagi | |
| 2021/0160437 A1* | 5/2021 | Higuchi | G06F 18/2163 |
| 2022/0073077 A1* | 3/2022 | Taieb | G08G 1/09623 |
| 2022/0274620 A1 | 9/2022 | Takagi | |
| 2023/0308598 A1 | 9/2023 | Higashiyama | |

FOREIGN PATENT DOCUMENTS

| | | |
|---|---|---|
| JP | 2021-064084 A | 4/2021 |
| WO | 2018/016305 A1 | 1/2018 |

* cited by examiner

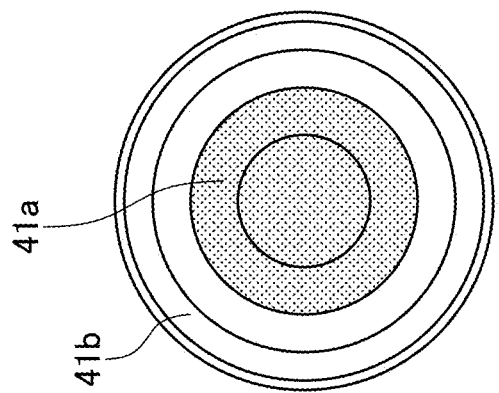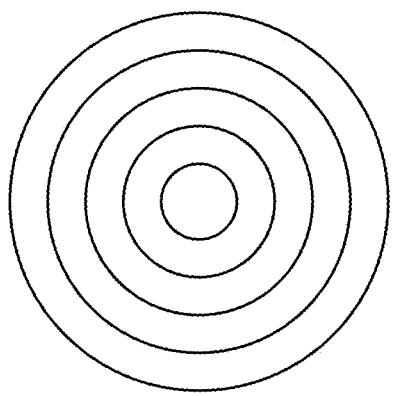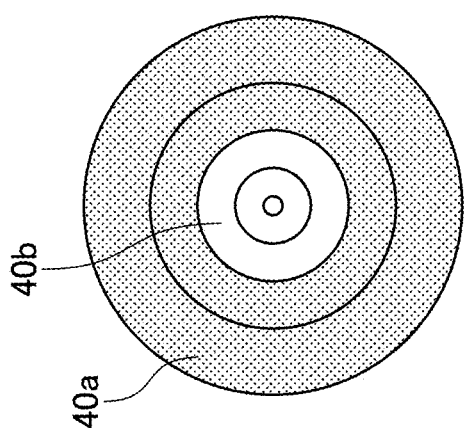

FIG. 9A
FIG. 9B
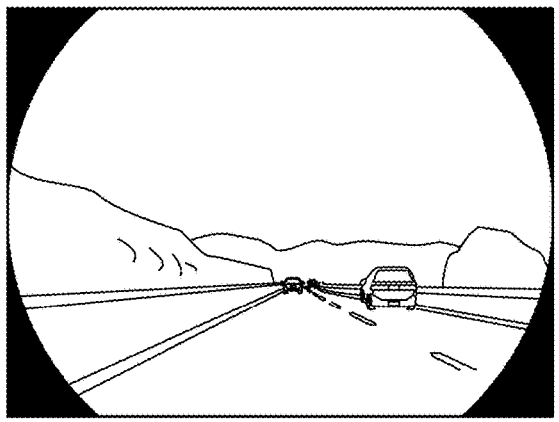
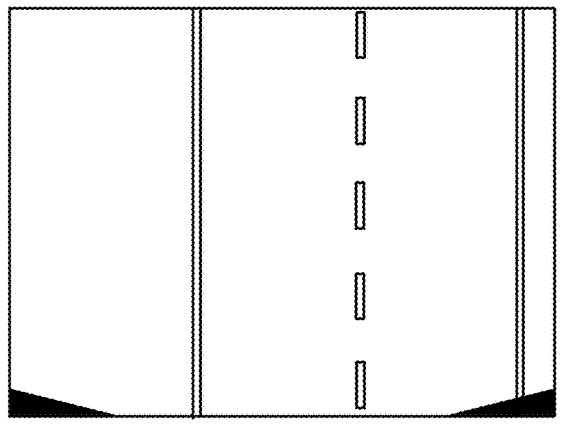

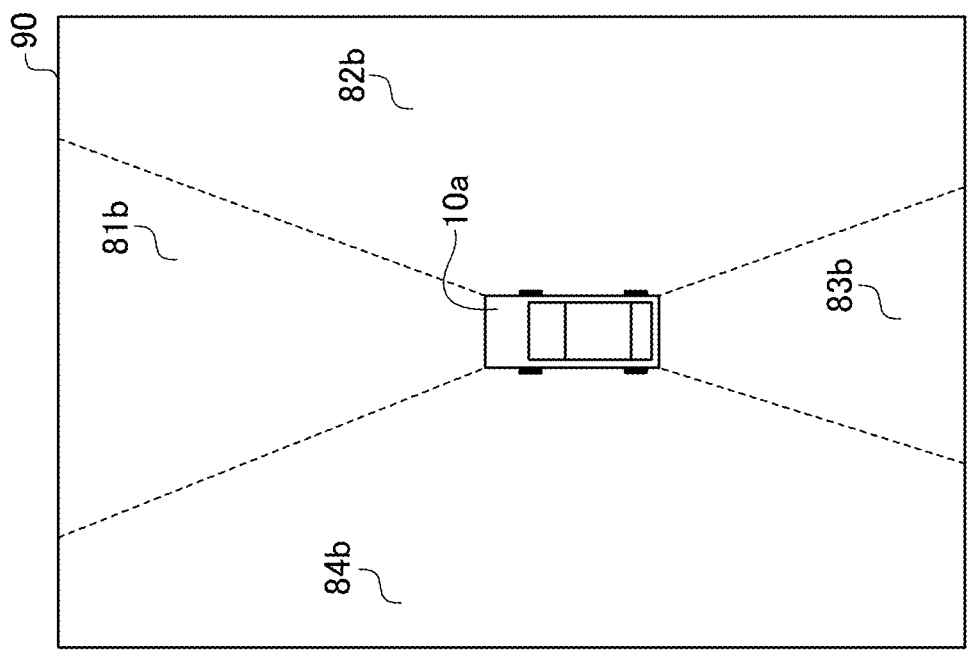
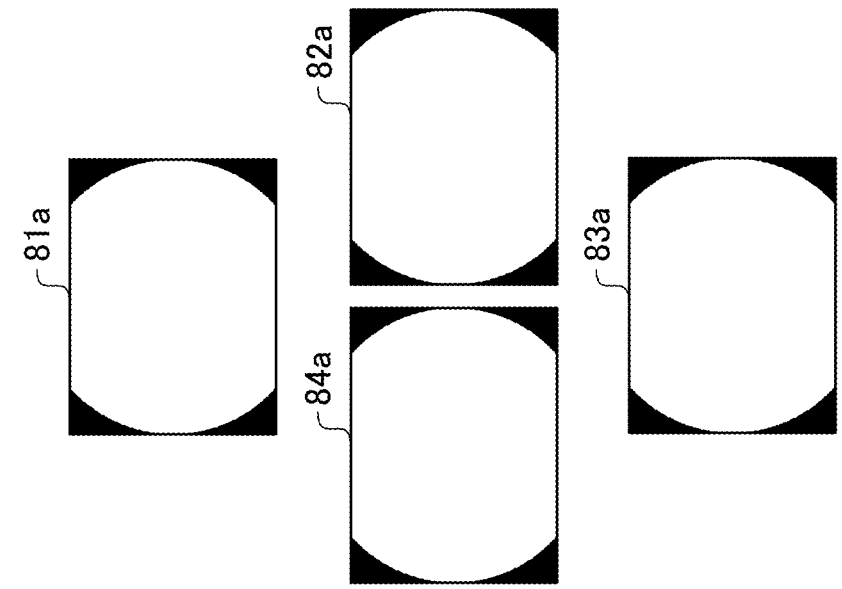

IMAGE PROCESSING SYSTEM, MOVABLE APPARATUS, IMAGE PROCESSING METHOD, AND STORAGE MEDIUM

This application is a continuation-in-part of International Patent Appln. No. PCT/JP2023/001958 filed Jan. 23, 2023.

BACKGROUND OF THE INVENTION

Field

The present invention relates to an image processing system, a movable apparatus, an image processing method, a storage medium, and the like.

Description of the Related Art

There is a system for generating a bird's-eye video (bird's-eye view) by capturing the surroundings of a movable apparatus such as a vehicle while an operator operates the movable apparatus. Japanese Patent Laid-Open No. 2008-283527 discloses a technique of capturing the surroundings of a vehicle and displaying a bird's-eye video.

However, the technique disclosed in Japanese Patent Laid-Open No. 2008-283527 has a problem that, when an area far from the camera or a peripheral area of the camera image is processed to be enlarged, the sense of resolution of the enlarged peripheral area deteriorates.

SUMMARY OF THE INVENTION

An image processing system according to an aspect of the present invention includes a first optical system that forms a first optical image having a low-resolution area corresponding to an angle of view less than a first angle of view and a high-resolution area corresponding to an angle of view greater than or equal to the first angle of view, a first imaging unit that captures the first optical image formed by the first optical system to generate first image data, and an image processing unit that deforms the first image data to generate first deformed image data.

Further features of the present disclosure will become apparent from the following description of embodiments with reference to the attached drawings.

BRIEF DESCRIPTION OF THE DRAWINGS

FIG. 3, part (B), is a diagram showing projection characteristics representing the relationship between the image height y1 and a half angle of view θ1 of the optical system 1 according to the first embodiment.

FIGS. 4A to 4C are diagrams illustrating an image height of each optical system at each half angle of view on a light-receiving plane of an image sensor in contour lines.

FIG. 9A is a diagram illustrating an example of an imaging range of a camera 11 while the vehicle 10 is traveling, and FIG. 9B is a diagram illustrating an example of an image obtained by coordinate transforming (deforming) the image of FIG. 9A acquired by the camera 11 into a video from a virtual viewpoint directly above the vehicle (orthographic projection).

FIG. 10A is a diagram illustrating examples of captured images 81a to 84a acquired by the cameras 11 to 14, and FIG. 10B is a diagram illustrating a composite image 90 obtained by combining the captured images.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

In a first embodiment, a system with four cameras installed to perform capturing in each of four directions around an automobile as a movable apparatus to generate a video in which the vehicle is looked down from a virtual viewpoint directly above the vehicle (bird's-eye view) will be described.

Further, the present embodiment intends to improve visibility of a video taken from a virtual viewpoint by assigning an area that can be acquired at a high resolution (high-resolution area) to an area enlarged at the time of conversion of the viewpoint of the camera image.

Figure 1:
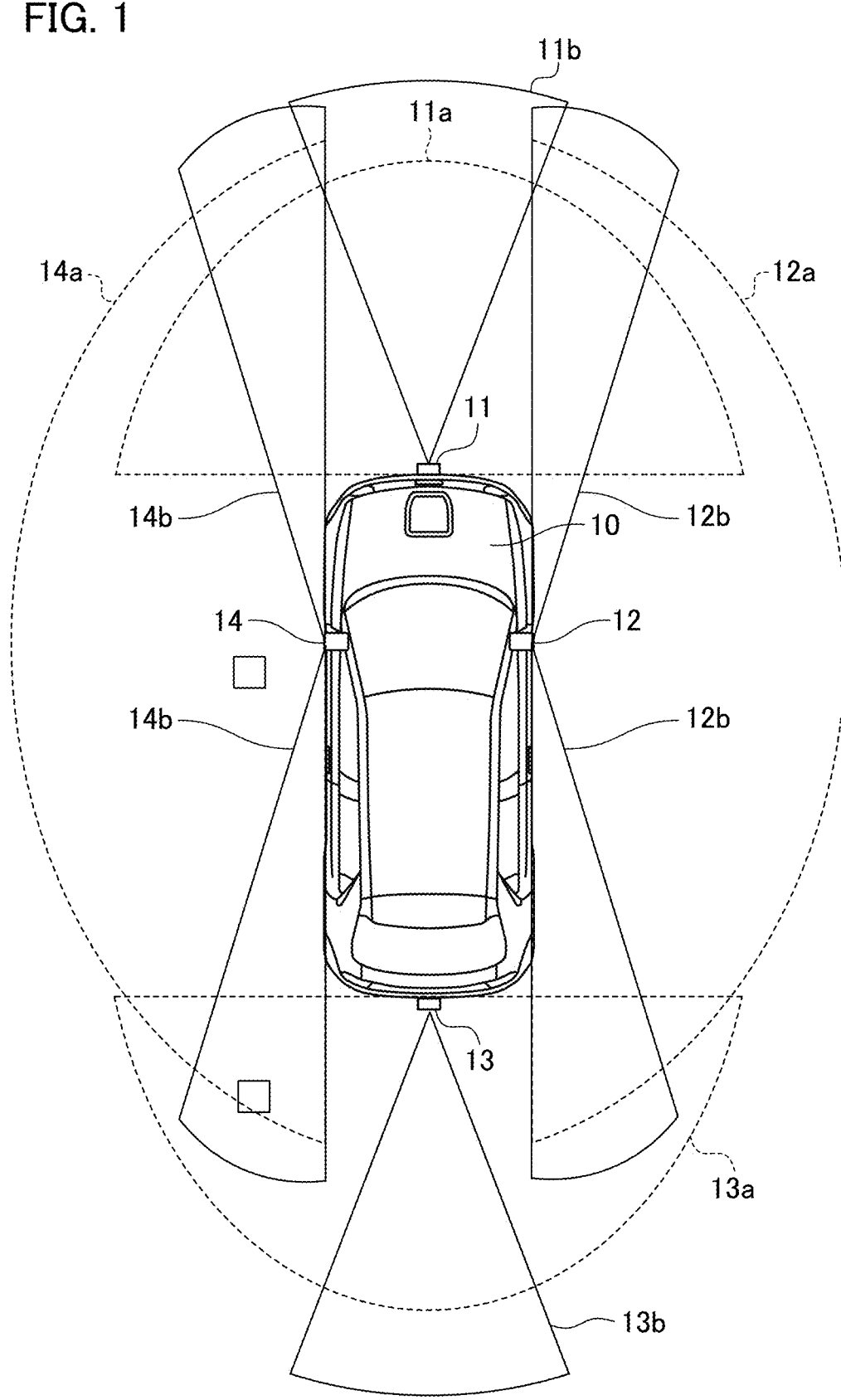
FIG. 1 is a diagram for describing a vehicle (e.g., an automobile) and imaging ranges of cameras according to a first embodiment.

FIG. 1 is a diagram for explaining a vehicle (e.g., an automobile) and imaging ranges of cameras according to a first embodiment. Cameras 11, 12, 13, and 14 (imaging unit) are installed at positions on the front, right, rear, and left sides of the vehicle 10 (movable apparatus), respectively, as illustrated in FIG. 1.

The cameras 11 to 14 are imaging units having optical systems and image sensors. The cameras 11 to 14 have imaging directions of the forward, right, rearward, and left sides of the vehicle 10 set as imaging ranges, and each of the cameras has an imaging range at about, for example, 180 degrees of angle of view. Alternatively, each of the optical axes of the optical systems included in the cameras 11 to 14 is installed to be horizontal to the vehicle 10 when the vehicle 10 is placed on a horizontal road surface.

The imaging ranges 11a to 14a schematically indicate the horizontal angles of view of the cameras 11 to 14, and reference signs 11b to 14b indicate high-resolution areas, schematically indicating areas in which the cameras can acquire images at high resolutions due to characteristics of the optical systems.

The cameras 11 and 13, which are front and rear cameras, can acquire images of the area near the optical axis at a high resolution, and the cameras 12 and 14, which are side cameras, can acquire images of peripheral view angle areas away from the optical axis at a high resolution. Further, although the imaging ranges of the cameras 11 to 14 and high-resolution areas are actually three-dimensional ranges, they are schematically expressed in the plane in FIG. 1. In addition, the imaging range of each camera overlaps the imaging range of another adjacent camera in the periphery.

Figure 2:
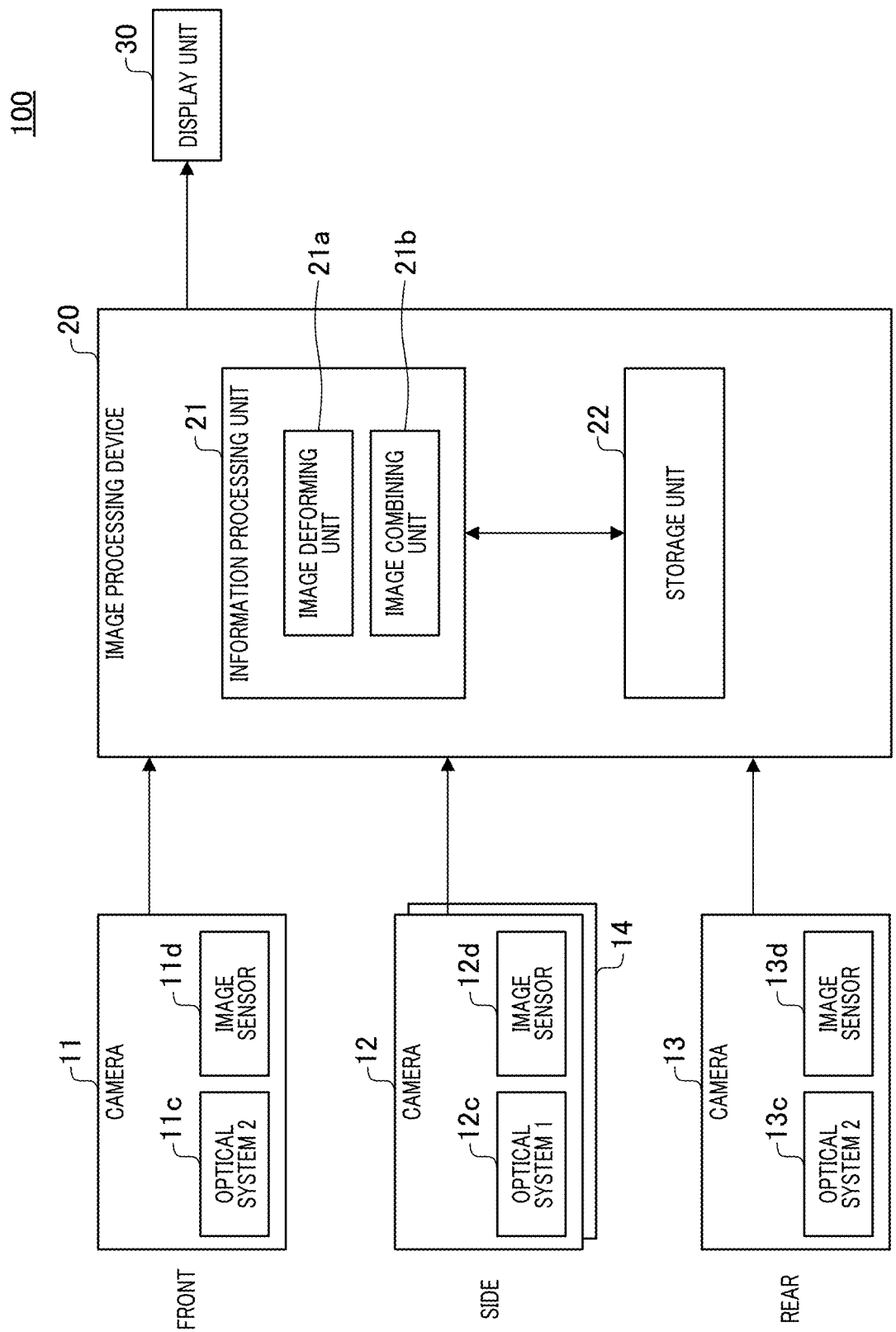
FIG. 2 is a functional block diagram for describing a configuration of an image processing system 100 according to the first embodiment.

Next, FIG. 2 is a functional block diagram for describing a configuration of an image processing system 100 according to the first embodiment, describing the image processing system 100 using FIG. 1. Further, some of the functional blocks illustrated in FIG. 2 are realized by causing a computer included in the image processing system 100, which is not illustrated, to execute a computer program stored in a storage unit 22 serving as a storage medium.

In addition, the functional blocks illustrated in FIG. 2 may not be built into the same housing, and may be configured as individual devices connected to each other via a signal path.

In FIG. 2, the image processing system 100 is mounted in the vehicle 10 such as an automobile. The cameras 11 to 14 have image sensors 11d to 14d for capturing optical images and optical systems 11c to 14c for forming optical images on the light-receiving surfaces of the image sensors (14c and 14d are not illustrated). Thus, the surrounding situations are acquired as image data.

Optical systems 1 (first optical systems) included in the cameras 12 and 14 (first imaging unit) disposed on the sides have optical characteristics of forming high-resolution optical images in peripheral view angle areas away from the optical axis and forming low-resolution optical images in narrow view angle areas around the optical axis.

Each of optical systems 2 (second optical systems) included in the cameras 11 and 13 (second imaging unit) disposed on the front and rear sides, which are different from the first imaging unit, forms high-resolution optical images in narrow view angle areas around the optical axis. In addition, the optical systems have optical characteristics of forming low-resolution optical images in peripheral view angle areas away from the optical axis. Details of the optical systems 11c to 14c will be described below.

The image sensors 1id to 14d are, for example, CMOS image sensors, or CCD image sensors, and photoelectrically convert optical images and output imaging data. The image sensors 11d to 14d have RGB color filters, for example, being arrayed for each pixel in the Bayer array. By performing demosaicing, color images can be acquired.

An image processing device 20 (image processing unit) has an information processing unit 21, a storage unit 22, and various interfaces (not illustrated) for data and power input/output, and includes various types of hardware. In addition, the image processing device 20 is connected to the cameras 11 to 14, and outputs image data obtained by combining a plurality of pieces of image data acquired from each of the cameras to a display unit 30 as a video.

The information processing unit 21 has an image deforming unit 21a and an image combining unit 21b. In addition, the information processing unit has, for example, a system-on-chip (SoC), a field programmable gate array (FPGA), a CPU, an ASIC, a DSP, a graphics processing unit (GPU), a memory, and the like.

The CPU executes computer programs stored in the memory to perform various kinds of control over the image processing system 100 including the cameras and the display unit as a whole.

Further, in the first embodiment, the image processing device and the cameras are accommodated in separate housings. In addition, the information processing unit 21 performs DeBayering on image data input from each of the cameras in accordance with the Bayer array and converts the image data into image data in the RGB raster format. Furthermore, the information processing unit performs various kinds of image processing and image adjustment such as white balance adjustment, gain/offset adjustment, gamma processing, color matrix processing, lossless compression processing, lens distortion correction processing, and the like.

In addition, the image deforming unit 21a performs image deformation processing for viewpoint conversion, and then the image combining unit 21b combines a plurality of images to join together. Details thereof will be described below.

The storage unit 22 is an information storage device such as a ROM and stores information necessary for controlling the entire image processing system 100. Further, the storage unit 22 may be a removable recording media such as a hard disk or an SD card.

In addition, the storage unit 22 stores, for example, camera information of each of the cameras 11 to 14, a coordinate transformation table for performing image deforming/combining processing, and parameters for controlling the image processing system 100. Furthermore, image data generated by the information processing unit 21 may be recorded.

The camera information includes optical characteristics of the optical system 1 and the optical system 2, the number of pixels of the image sensors 11d to 14d, photoelectric conversion characteristics, gamma characteristics, sensitivity characteristics, frame rates, image format information, mounting position coordinates of the cameras in the vehicle coordinate system, and the like. In addition, the camera information may include not only design values of the cameras but also adjustment values that are values unique to each individual camera.

The display unit 30 has a liquid crystal display or an organic EL display as a display panel and displays videos (images) output from the image processing device 20. Thus, the user can figure out the situations around the vehicle. Further, the number of display units is not limited to one. Due to two or more display units, the pattern of viewpoint differences of composite images, a plurality of images acquired from the cameras, and other information display may be output on each of the display units.

Next, optical characteristics of the optical system 1 and the optical system 2 included in the cameras 11 to 14 will be described in detail.

First, the optical characteristics of the optical system 1 and the optical system 2 will be described with reference to FIGS. 3 and 4. It is assumed in the first embodiment that the cameras 12 and 14 have the optical systems 1 having the same characteristics, and the cameras 11 and 13 have the optical systems 2 having the same characteristics. However, the optical systems of the cameras 11 to 14 may have different optical characteristics.

Figure 3:
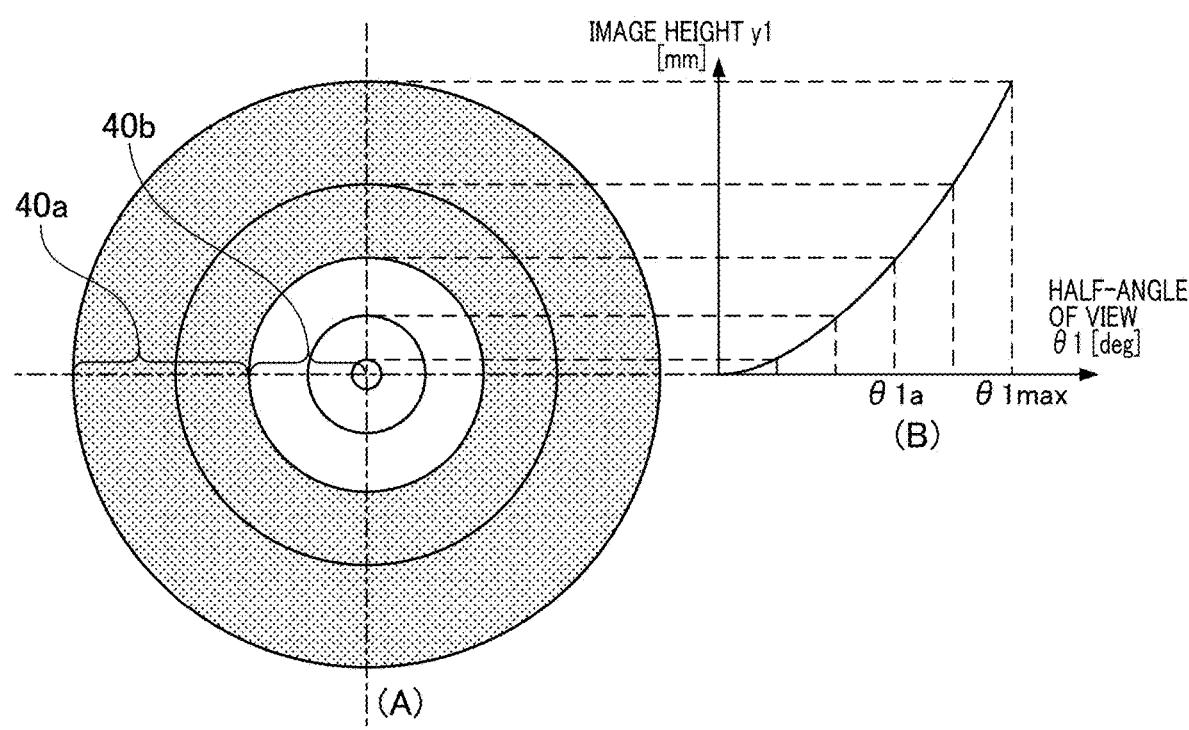
FIG. 3, part (A), is a diagram illustrating an image height y1 of an optical system 1 according to the first embodiment at each half angle of view on a light-receiving plane of an image sensor in contour lines.

FIG. 3, part (A), is a diagram illustrating an image height y1 of the optical system 1 according to the first embodiment at each half angle of view on a light-receiving plane of an image sensor in contour lines. In addition, FIG. 3, part (B), is a diagram showing projection characteristics representing the relationship between the image height y1 and a half angle of view θ1 of the optical system 1 according to the first embodiment. In FIG. 3, part (B), the half angle of view (angle between the optical axis and an incident light beam) θ1 is illustrated on the horizontal axis, and the image formation height (image height) y1 on the light-receiving planes (on the image plane) of the cameras 12 and 14 is illustrated on the vertical axis.

FIGS. 4A to 4C are diagrams illustrating image heights of optical systems at each half angle of view on a light-receiving plane of an image sensor in contour lines, and FIG. 4A is of the optical system 1, FIG. 4B is of an equidistant projection-type optical system, and FIG. 4C is of the optical system 2. That is, FIG. 3, part (A), and FIG. 4A are the same. In addition, 40a and 41a in FIGS. 3 and 4 represent high-resolution areas filled in a thin color. In addition, 40b and 41b are low-resolution areas.

As illustrated in FIG. 4(B), the lens in the equidistant projection type (y=fθ), which is a general fisheye lens, has projection properties of a proportional relationship in constant resolution between image height positions.

On the other hand, the optical system 1 included in the cameras 12 and 14 is configured such that the projection characteristic y1(θ1) changes in an area with a low half angle of view θ1 (near the optical axis) and an area with a high half angle of view (an area away from the optical axis) as indicated by the projection characteristics in FIG. 3, part (B). In other words, when an increment of the image height y1 with respect to the half angle of view θ1 per unit (that is, the number of pixels per unit angle) is set as a resolution, the resolution varies depending on areas.

It can also be said that such a local resolution can be expressed as a differential value of the projection characteristic y1(θ1) at the half angle of view θ1 "dy1(θ1)/dθ1". That is, it can be said that the resolution becomes higher as the slope of the projection characteristic y1(θ1) of FIG. 3, part (B), is higher. In addition, it can also be said that the resolution becomes higher as the interval of the image height y1 at each contour-line half angle of view of FIG. 3, part (A), becomes greater.

In the first embodiment, an area around the center formed on the light-receiving plane of the image sensor when the half angle of view θ1 is less than a predetermined half angle of view θ1a is referred to as a low-resolution area 40b, and an outer area when the half angle of view θ1 is greater than or equal to the predetermined half angle of view θ1a is referred to as a high-resolution area 40a. That is, the optical system 1 (first optical system) forms a first optical image including the low-resolution area 40b corresponding to an angle of view less than a first angle of view (half angle of view θ1a) and the high-resolution area corresponding to an angle of view greater than or equal to the first angle of view (half angle of view θ1a).

In addition, the cameras 12 and 14 (first imaging unit) capture the first optical image formed by the first optical system to generate first image data.

Note that the value of the half angle of view θ1a is merely an example for describing the optical system 1, and is not an absolute value. In addition, the high-resolution area 40a corresponds to the high-resolution areas 12b and 14b in FIG. 1.

When the projection characteristics of FIG. 3, part (B), are viewed, the projection characteristics are understood such that the increase rate (slope) of the image height y1 in the low-resolution area 40b with a small angle of view near the optical axis is low, and the increase rate (slope) increases as the angle of view gradually becomes greater. These are distinctive projection characteristics with an even greater change in the slope than in the generally-known stereographic projection (y=2f×tan(θ/2)).

It is preferable to satisfy the following conditional expression (1) to realize these characteristics.

$$0.2 < \frac{2f1 \times \tan\left(\frac{\theta 1_{max}}{2}\right)}{y1(\theta 1_{max})} < A \quad (1)$$

y1(θ1) indicates a projection characteristic representing the relation between the half angle of view θ1 of the first optical system and the image height y1 on the image plane, θ1max indicates a maximum half angle of view of the first optical system (angle formed by the optical axis and the outermost main light beam), and f1 indicates a focal length of the first optical system.

In addition, A indicates a predetermined constant and is better to be determined taking the balance in resolution between the high-resolution area and the low-resolution area into account. However, it is desirably about 0.92, and more desirably about 0.8.

If the value exceeds the lower limit of expression (1), image curvatures, distortion aberrations, and the like deteriorate, so good image quality cannot be acquired. If the value exceeds the upper limit, the difference in resolution between the central area and the peripheral area becomes smaller, and thus required projection characteristics cannot be realized.

The optical systems 2 included in the cameras 11 and 13 are configured to have the projection characteristic of the high-resolution area near the optical axis as the area is filled in a light color in FIG. 4C, and the area having an angle of view smaller than a predetermined angle of view and the area having an angle of view greater than or equal to the predetermined angle of view have different projection characteristics y2(θ2).

In each optical system 2 of the first embodiment, an area around the center generated on the sensor plane when the half angle of view θ2 is less than a predetermined half angle of view θ2b is referred to as a high-resolution area 41a, and an outer area when the half angle of view θ2 is greater than or equal to the predetermined half angle of view θ2b is referred to as a low-resolution area 41b. That is, the optical system 2 (second optical system) forms a second optical image having the high-resolution area 41a corresponding to an angle of view less than a second angle of view (half angle of view θ2b) and the low-resolution area 41b corresponding to an angle of view greater than or equal to the second angle of view.

In addition, the cameras 11 and 13 (second imaging unit) captures the second optical image formed by the second optical system to generate second image data.

Here, in FIG. 4C, the value of θ2 corresponding to an image height position on the boundary of 41a and 41b is θ2b, and the angle of view of the high-resolution area 41a corresponds to the high-resolution areas 11b and 13b in FIG. 1.

The optical systems 2 (second optical systems) are configured such that, in the high-resolution area 41a, the projection characteristic y2(θ2) representing the relation between the half angle of view θ2 of the second optical systems and the image height y2 on the image plane is greater than f2×θ2. However, f2 is the focal length of the second optical systems included in the cameras 11 and 13. In addition, the projection characteristic y2(θ2) of the high-resolution area is set to be different from the projection characteristic of the low-resolution area.

When θ2max is set as the maximum half angle of view of the optical systems 2, the ratio of θ2b to θ2max "θ2b/θ2max" is desirably greater than or equal to a predetermined lower limit value, and the predetermined lower limit value is desirably, for example, a value from 0.15 to 0.16.

In addition, the ratio of θ2b to θ2max "θ2b/θ2max" is desirably lower than or equal to a predetermined upper limit value, and the value is desirably, for example, a value from 0.25 to 0.35. For example, when θ2max is set to 90°, the predetermined lower limit value is set to 0.15, and the predetermined upper limit value is set to 0.35, θ2b is desirably determined in the range of 13.5° to 31.5°.

Furthermore, the optical systems 2 (second optical systems) are configured to satisfy the following expression (2).

$$1 < \frac{2f2 \times \sin\theta 2_{max}}{y2(\theta 2_{max})} \leq B \quad (2)$$

Here, B indicates a predetermined constant. By setting the lower limit value to 1, the center resolution can be increased compared with an orthographic projection-type (y=f×sin θ) fisheye lens having the same maximum imaging height, and by setting the upper limit value to B, satisfactory optical performance can be maintained while obtaining the angle of view equivalent to that of the fisheye lens. The predetermined constant B is better to be determined taking the balance in resolution between the high-resolution area and the low-resolution area into account, and is desirably a value from 1.9 to 1.4.

Figure 5:
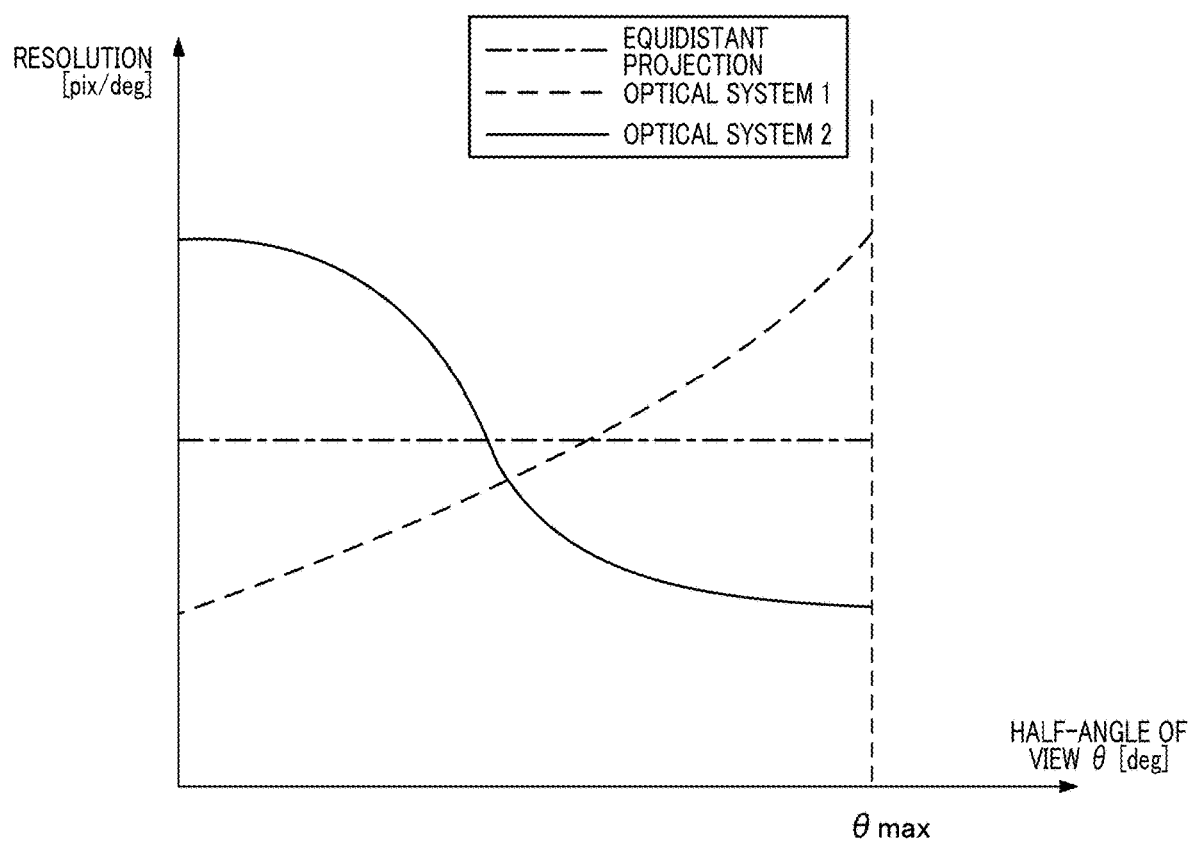
FIG. 5 is a graph showing an example of equidistant projection, and resolution characteristics of the optical system 1 and an optical system 2 according to the first embodiment.

FIG. 5 is a graph showing an example of equidistant projection, and resolution characteristics of the optical systems 1 and the optical systems 2 according to the first embodiment. The horizontal axis represents half angle of view θ and the vertical axis represent resolution that is the number of pixels per unit angle of view. While the resolution is constant at any half angle of view position in equidistant projection, the optical systems 1 have characteristics that the resolution is higher at a position with a greater half angle of view, and the optical systems 2 have characteristics that the resolution is higher at a position with a smaller half angle of view.

By using the optical systems 1 and the optical systems 2 having the above-described characteristics, while imaging is performed at a wide angle of view equivalent to that of a fisheye lens, for example, 180 degrees, images with a high resolution can be acquired in high-resolution areas.

That is, in the optical systems 1, a peripheral angle-of-view area away from the optical axis is a high-resolution area, and when the optical systems are disposed on the sides of the vehicle, a high-resolution image with little distortion in the front-rear direction of the vehicle can be acquired.

With respect to the optical systems 2, the area near the optical axis is a high-resolution area, and the systems have characteristics approximate to the center projection type (y=f×tan θ) or the equidistant projection type (y=f×θ) which are projection characteristics of an optical system for general imaging, and thus a detailed image can be expressed with little optical distortion. Thus, a sense of natural perspective when viewing a nearby vehicle such as a preceding vehicle or a following vehicle can be obtained, and satisfactory visibility with prevented deterioration in the image quality can be obtained.

Further, the optical systems 1 and the optical systems 2 can obtain similar effects with the projection characteristics y1(θ1) and y2(θ2) satisfying the conditions of expression (1) and expression (2) described above, and thus the optical systems 1 and the optical systems 2 according to the first embodiment are not limited to having the projection characteristics illustrated in FIGS. 3 to 5.

Figure 6:
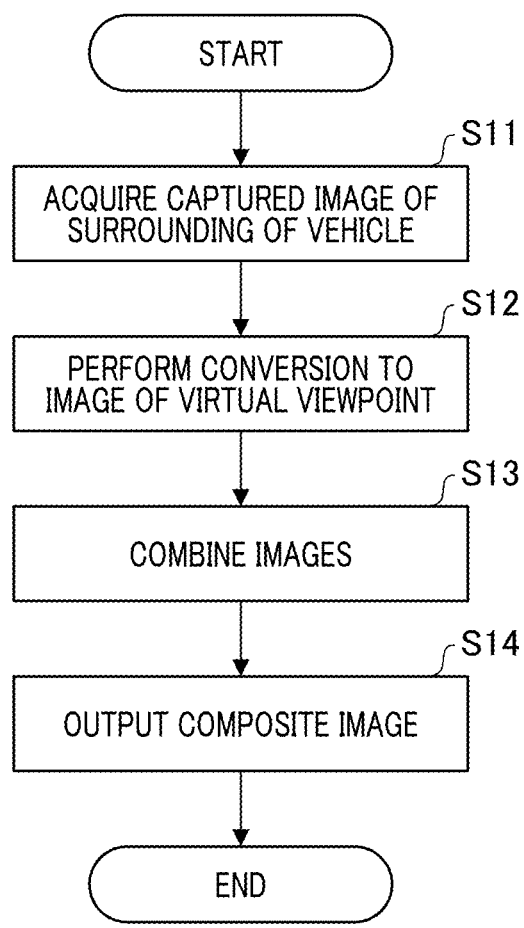
FIG. 6 is a flowchart for explaining a flow of an image processing method performed by an information processing unit 21 according to the first embodiment.

FIG. 6 is a flowchart for explaining the flow of an image processing method performed by the information processing unit 21 according to the first embodiment, and details of processing performed by the image deforming unit 21a and the image combining unit 21b will also be described using the processing flow of FIG. 6. The processing flow of FIG. 6 is controlled, for example, in units of frames by the CPU inside the information processing unit 21 performing a computer program stored in the memory.

The processing flow of FIG. 6 starts when the processing is triggered by power input to the image processing system 100, a user operation, a change in the traveling state, or the like.

In step S11, the information processing unit 21 acquires image data of the four directions of the vehicle 10 illustrated in FIG. 1, the image being captured by the cameras 11 to 14. Further, the cameras 11 to 14 perform the imaging simultaneously (in synchronization). That is, a first imaging step of generating first image data by imaging a first optical image and a second imaging step of generating second image data by imaging a second optical image are performed in synchronization.

In step S12, the information processing unit 21 performs image deformation processing for transforming the acquired image data to an image with a virtual viewpoint. That is, an image processing step of deforming the first image data and the second image data respectively to generate first deformed image data and second deformed image data is performed.

At this time, the image deforming unit deforms images acquired from the cameras 11 to 14 based on calibration data stored in the storage unit. Further, the images may be deformed based on various parameters of a coordinate transformation table based on the calibration data.

The content of the calibration data includes an internal parameter of a camera resulting from a lens distortion amount of each camera or a deviation from the sensor position, an external parameter representing a relative positional relation between the cameras or vehicles, and the like.

Figure 7:
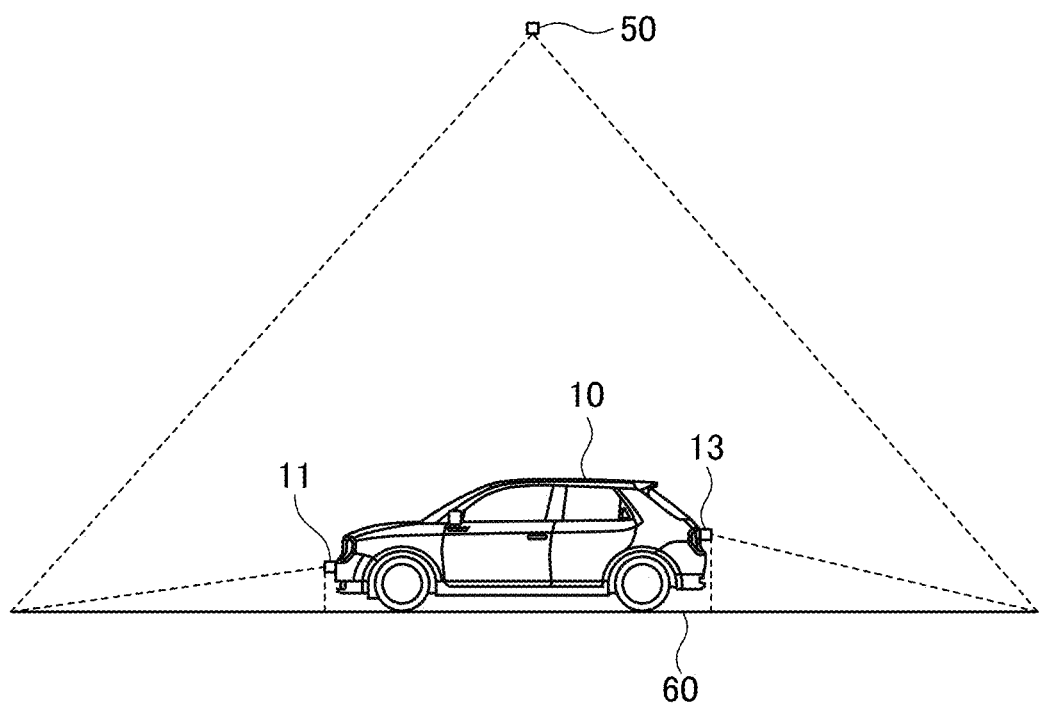
FIG. 7 is a diagram for describing a virtual viewpoint and image deformation according to the first embodiment.

Viewpoint conversion will be described using FIG. 7. FIG. 7 is a diagram for describing a virtual viewpoint and image deformation according to the first embodiment, in which a vehicle 10 is traveling on a road surface 60. Further, the cameras 12 and 14 on the sides of the vehicle are omitted from the illustration. The cameras 11 and 13 capture the forward and rearward sides of the vehicle 10, and the imaging range of the cameras 11 and 13 includes the road surface 60 around the vehicle 10.

The position of the road surface 60 is projected as a projection surface in images acquired by the cameras 11 and 13, and coordinates in the images are transformed (deformed) based on the assumption that a virtual camera is placed at the virtual viewpoint 50 directly above the vehicle and the projection surface is captured. That is, coordinates in the images are transformed to generate a virtual viewpoint image taken from the virtual viewpoint.

By using the various parameters included in the calibration data, the image is projected on the projection surface, and an image taken from another viewpoint can be obtained by transforming coordinates. Further, the calibration data is assumed to be calculated by performing calibration on the cameras in advance. In addition, if the virtual camera is thought as an orthographic projection camera, an image in which the sense of distance can be easily ascertained with no distortion can be generated.

In addition, images of the cameras 12 and 13 on the sides, which are not illustrated, can be deformed through the same processing. In addition, the projection surface may not be a plane imitating a road surface, and may be, for example, a three-dimensional bowl shape. In addition, the position of the virtual viewpoint may not be right above the vehicle, and may be, for example, an oblique front side or an oblique rear side of the vehicle, or a position at a viewpoint at which the surroundings are viewed from the inside of the vehicle.

Although the image deformation processing has been described above, at that time, an area that is greatly enlarged by coordinate deformation of an image is generated.

Figure 8A:
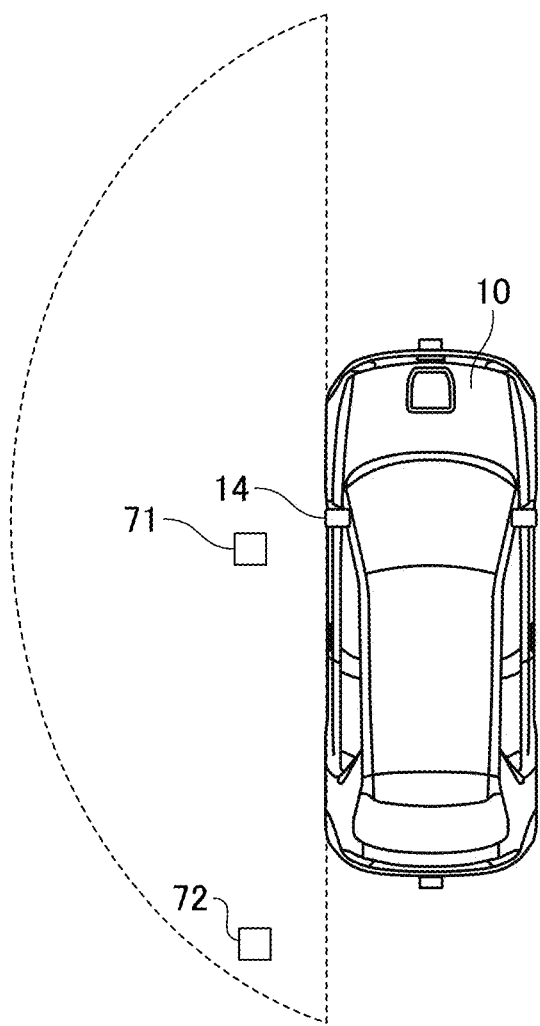
FIG. 8A is a schematic diagram illustrating a vehicle 10 on a road and an imaging range of a camera 14 on the left side surface of the vehicle.
Figure 8B:
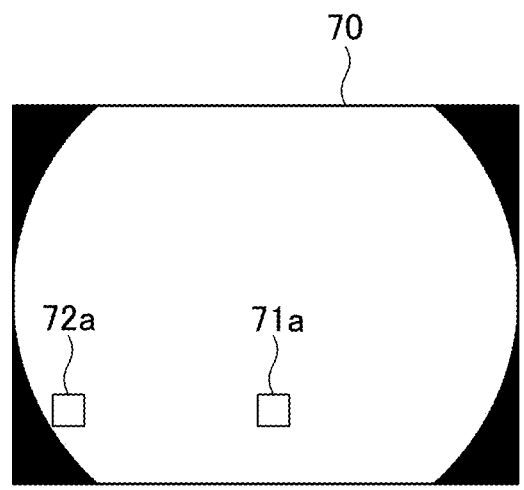
FIG. 8B is a schematic diagram of an image 70 acquired by the camera 14.

FIG. 8A is a schematic diagram illustrating a vehicle 10 on a road and an imaging range of a camera 14 on the left side surface of the vehicle, and FIG. 8B is a schematic diagram of an image 70 acquired by the camera 14. The area in the image 70 filled in black color indicates the outside of the angle of view, indicating that no images can be acquired therefrom.

The areas 71 and 72 on the road surface have the same size, each being included in the imaging range of the camera 14, and are displayed at the positions of the areas 71*a* and 72*a*, for example, on the image 70. Here, if the optical system of the camera 14 is of the equidistant projection type, the area 72*a* in a far distance from the camera 14 is distorted, and displayed on the image in a small size (low resolution).

However, if viewpoint conversion processing is performed by the orthographic projection virtual camera as described above, the areas 71 and 72 are enlarged to the same size. At this time, because the area 72 is greatly enlarged from the original image 70 compared with the area 71, the visibility deteriorates.

That is, when the optical systems of the cameras 12 and 14 on the sides in the first embodiment are set to perform equidistant projection, a peripheral portion of an acquired image away from the optical axis is enlarged through image deformation processing, and thus, the visibility of the deformed image becomes deteriorating.

With respect to this issue, since the cameras 12 and 14 on the sides according to the first embodiment use the optical system 1 having the characteristics as indicated in FIG. 3, the peripheral portion away from the optical axis can be acquired with a high resolution. Thus, even when an image is enlarged, deterioration in the visibility can be prevented, compared with equidistant projection.

FIG. 9A is a diagram illustrating an example of a captured image of the camera 11 while the vehicle 10 is traveling, and FIG. 9B is a diagram illustrating an example of an image obtained by coordinate transforming (deforming) the image of FIG. 9A acquired by the camera 11 into a video from a virtual viewpoint directly above the vehicle (orthographic projection).

The image in FIG. 9A is an image obtained by capturing the vehicle 10 (automobile) traveling on the left lane of a long straight road with a constant road width. Further, although a distortion actually occurs due to distortion in FIG. 9A, it has been simplified. In FIG. 9A, the road width becomes narrower as the vehicle becomes distant due to perspective effects.

However, when the viewpoint is converted with orthographic projection by the virtual camera at the virtual viewpoint as described above, the image is enlarged such that the road width is the same on both the near side and the distant side of the vehicle as illustrated in FIG. 9B. When the optical systems of the cameras 11 and 13 disposed in the front-rear direction of the advancing direction of the vehicle in the first embodiment are set to perform equidistant projection, the image center area near the optical axis is greatly enlarged, and thus, the visibility of the deformed image becomes deteriorating.

With respect to this issue, since the cameras 11 and 13 disposed in the front-rear direction according to the first embodiment have the characteristics as those of the optical system 2, the area near the optical axis can be acquired with a high resolution. Thus, even when the center area of the image is enlarged, deterioration in the visibility can be reduced, compared with equidistant projection.

Returning to description of the flow of FIG. 6, in step S13, the information processing unit 21 combines a plurality of images converted and deformed in step S12. That is, the pieces of the second image data generated from capturing by the cameras 11 and 13 (second imaging unit) and the first image data generated from capturing by the cameras 12 and 14 (first imaging unit) are deformed and combined to generate a composite image.

FIG. 10A is a diagram illustrating examples of captured images 81*a* to 84*a* acquired by the cameras 11 to 14, and FIG. 10B is a diagram illustrating a composite image 90 obtained by combining the captured images. After deformation processing using viewpoint conversion is performed on each of the captured images 81*a* to 84*a* in step S12, the images are combined according to each of the camera positions.

At this time, each of the images is combined at the positions of the areas 81*b* to 84*b* of the composite image 90, and a top surface image 10*a* of the vehicle 10 stored in the storage unit 22 in advance is overlapped on the vehicle position.

Thus, a video of the vehicle viewed down from the virtual viewpoint can be generated, and thus the situation around the vehicle can be ascertained. In addition, since the peripheral parts of the adjacent captured areas overlap each other in the captured image 81*a* to 84*a* as illustrated in FIG. 1, overlapping areas are present in the composite image.

However, by performing mask processing or alpha blending processing on the images at the boundary positions as indicated by the dashed lines in FIG. 10(B), the composite image 90 can be displayed as one image viewed from the virtual viewpoint. In addition, the combining positions for the cameras can be deformed and combined by using calibration data as in the image deformation of step S12.

In the first embodiment, the optical system 1 is used for the areas 82*b* and 84*b* because the areas away from the optical axis can be acquired with a high resolution. Thus, since the resolution of the areas 82*b* and 84*b* of the composite image 90 enlarged in the image deformation in the oblique front and oblique rear areas of the top surface image 10*a* of the vehicle 10 becomes higher, an image with high visibility can be generated.

In addition, in the first embodiment, the optical system 2 is used for the areas 81*b* and 83*b* because the areas near the optical axis can be acquired with a high resolution. Thus, since the resolution of the front and rear areas 81*b* and 83*b* of the composite image 90 enlarged in the image deformation in the areas away from the top surface image 10*a* of the vehicle 10 becomes higher, an image with high visibility can be generated.

There is a high possibility of a movable apparatus colliding with an obstacle in the advancing direction, and thus there is a demand for displaying such an obstacle up to a further distance. For this reason, the configuration of the first embodiment is effective in that the visibility of the movable apparatus particularly in a forward or rearward remote distance can be improved.

Further, while the images 81*a* and 83*a* acquired through the optical system 2 have a lowered resolution in peripheral portions away from the optical axis, the images 82*a* and 84*a* acquired through the optical system 1 have a high resolution in the peripheral portions away from the optical axis.

Thus, by preferentially using the images 82*a* and 84*a* acquired through the optical system 1 for the overlapping areas of the images when combining the video, the reduced resolution of the peripheral portions away from the optical axis caused by the optical system 2 can be compensated for.

For example, the boundaries that are dashed lines indicated in the composite image 90 may be set to increase the areas 82*b* and 84*b*. That is, the images may be combined such that the areas 81*b* and 83*b* become narrower and the areas 82*b* and 84*b* become wider.

Alternatively, by changing a ratio of alpha blending or the like between images, the weight of the image acquired by the optical system 1 around the boundaries that are the dashed lines indicated in the composite image 90 may be increased.

Returning to FIG. 6, in step S14, the information processing unit 21 outputs the image combined in step S13 and displays the image on the display unit 30. Thus, the user can recognize the video from the virtual viewpoint at a high resolution.

Thereafter, by repeatedly performing the flow of FIG. 6 in units of frames, the images can be displayed as a moving image, and the relative position of the obstacle can be ascertained at a high resolution.

OTHER EMBODIMENTS

In the first embodiment, the example in which the image processing system 100 is mounted on a vehicle such as an automobile as a movable apparatus has been described. However, such a movable apparatus in the first embodiment is not limited to a vehicle, and any movable apparatus that makes movement such as a train, a ship, an airplane, a robot, or a drone may be applied. In addition, the image processing system 100 of the first embodiment includes systems mounted in such movable apparatuses.

In addition, the first embodiment can be applied even to a case in which such a movable apparatus is controlled with a remote controller.

In addition, although the information processing unit 21 is mounted in the image processing device 20 of the vehicle 10 in the first embodiment, some of the processing of the information processing unit 21 may be performed inside the cameras 11 to 14. In that case, the cameras 11 to 14 also include an information processing unit such as a CPU or a DSP, and output images to the image processing device after performing various kinds of image processing and image adjustment.

In addition, some of the processing of the information processing unit 21 may be performed by, for example, an external server, or the like via a network. In this case, although the cameras 11 to 14 are mounted on the vehicle 10, for example, some of the functions of the information processing unit 21 can be processed by, for example, an external device such as an external server.

In addition, although the storage unit 22 is included in the image processing device 20, the storage unit may be configured to be included in the cameras 11 to 14 and the display unit 30. If the storage unit is configured to be included in the cameras 11 to 14, parameters unique to each of the cameras can be managed in association with the camera body.

In addition, some or all of the constituent elements included in the information processing unit 21 may be realized as hardware. A dedicated circuit (ASIC), a processor (reconfigurable processor or DSP), or the like can be used for the hardware. Thus, processing can be performed at a high speed.

In addition, the image processing system 100 may include an operation input unit that receives inputs of user operation, for example, an operation panel including buttons, and the like, and the display unit may include a touch panel, or the like. Accordingly, a switch to an image processing device mode can be performed, and a switch of a camera video (image) desired by the user or a switch of a virtual viewpoint position can be performed.

In addition, the image processing system 100 may include a communication unit that performs communication based on a protocol, for example, CAN, Ethernet, or the like to communicate with a travel control unit, which is not illustrated, or the like provided inside the vehicle 10.

Then, as control signals from the travel control unit, information and the like about a travel (movement) state of the vehicle 10, for example, a traveling speed, a traveling direction, states of the shift lever, shift gear, turn indicator, a direction of the vehicle 10 indicated by a geomagnetic sensor, and the like may be acquired.

In addition, a switch to the mode of the image processing device 20 may be performed according to the control signal indicating such a movement state, and a switch of a camera video (image) or a switch of a virtual viewpoint position can be performed according to the travel state. That is, whether to generate a composite image by deforming each piece of the first image data and the second image data and combining the data according to the control signal indicating the movement state of the movable apparatus may be controlled.

Specifically, for example, when the movement speed of the movable apparatus is lower than a predetermined speed (for example, lower than 10 km), a composite image may be generated by deforming each piece of the first image data and the second image data and combining the data, and then displayed.

Thus, the user can fully figure out the situations around the vehicle. On the other hand, conversely, when the movement speed of the movable apparatus is higher than or equal to the predetermined speed (for example, higher than or equal to 10 km), the second image data from the camera 11 performing capturing in the advancing direction of the movable apparatus may be processed and displayed. This is because, when the movement speed is high, it needs to preferentially ascertain the image of the far front position.

In addition, the image processing system 100 may not display videos on the display unit 30, and may be configured to record generated images in the storage unit 22 or a storage medium of an external server. In addition, the example in which an image is acquired by connecting the cameras 11 to 14 and the image processing device 20 has been described in the first embodiment.

However, it may be configured such that an optical image having a low-resolution area and a high-resolution area is captured by using the optical system 1, the optical system 2, and the like of the cameras, and the acquired image data is transmitted to an external image processing device 20 via, for example, a network. Alternatively, a composite image may be generated by reproducing the above-described image data temporarily stored in the storage medium with the image processing device 20.

In addition, although the image processing system has four cameras in the first embodiment, the number of cameras included in the image processing system is not limited to four. The number of cameras included in the image processing system may be, for example, two or six. Furthermore, the effects can be obtained also from an image processing system with one or more cameras (first imaging unit) having the optical system 1 (first optical system).

That is, since there is a problem that the resolution deteriorates in the peripheral portion of the imaging screen even when an image acquired from one camera is deformed, the visibility in the peripheral portion of the screen after deformation can be improved likewise by using the camera having the optical system 1. Further, since image combining is not necessary when one camera is used, the image combining unit 21b is not needed.

In addition, in the first embodiment, the image processing system 100 has two cameras with the optical system 1 disposed on the side of the movable apparatus and the cameras with the optical system 2 disposed on the front and rear sides. That is, the first imaging unit is disposed on at least one side of the right side and the left side with respect to the advancing direction of the movable apparatus, and the second imaging unit is disposed on at least one side of the front side and the rear side with respect to the advancing direction of the movable apparatus.

However, the embodiment is not limited to this configuration. For example, a camera configuration in which one or more cameras with the optical system 1 are provided and other cameras are configured by combining a general fisheye lens and various lenses may be adopted, or a camera configuration with a combination of one camera with the optical system 1 and one camera with the optical system 2 may be adopted.

Specifically, a part of the imaging areas of two adjacent cameras (the imaging area of the first imaging unit and the imaging area of the second imaging unit), for example, may be disposed to overlap each other. In addition, when respective images are combined to generate one moving image, the optical system 1 is used in one camera, and the optical system 2 is used in another camera to generate a composite video. At this time, in the overlapping area of the two images, the image of the optical system 1 is preferentially used.

Thus, a combined video (image) in which the low resolution of the peripheral portion of the optical system 2 is compensated for by the high-resolution area of the optical system 1 while using the high-resolution area near the optical axis of the optical system 2 can be generated. That is, the first and second image data obtained from the first and second imaging unit can be deformed respectively by the image processing unit, and the display unit can display high-resolution composite data in which the deformed image data is combined.

In addition, in the first embodiment, the cameras with the optical system 1 are used as side cameras of the movable apparatus. However, a position of the first imaging unit is not limited to sides. For example, since there is the problem that the peripheral portion of the image is enlarged also in the case in which the cameras with the optical system 1 are disposed on the front and rear sides, this invention is effective when it is desired to improve the visibility of the peripheral portion of an image.

In such a case, the first image data obtained from the first imaging unit can be deformed by the image processing unit, and the display unit can display the deformed image data.

In addition, directions in which the cameras are disposed in the first embodiment are not limited to the four positions including the front, rear, left, and right sides. The cameras may be disposed in an oblique direction or at various positions according to the shape of the movable apparatus. For example, one or more cameras for capturing in the downward direction may be disposed in a movable apparatus such as an airplane or a drone.

In addition, although the images are deformed through a coordinate transformation for transforming the images into a video from the virtual viewpoint as the image deformation unit in the first embodiment, the invention is not limited thereto. Image deformation of processing an image to be stretched or enlarged may be adopted. Also in this case, the visibility of a deformed image can be improved likewise by disposing high-resolution areas of the optical system 1 and the optical system 2 in the enlarged area of the image as well.

In addition, although the optical axes of the cameras 11 to 14 are disposed to be horizontal to the movable apparatus in the first embodiment, the embodiment is not limited thereto. For example, the optical axis of the optical system 1 may be in a direction parallel to the vertical direction, and may be disposed in an oblique direction with respect to the vertical direction.

Although the optical axis of the optical system 2 may not be in a direction horizontal to the movable apparatus, it is desirable that the optical axis is disposed on the front and rear sides of the movable apparatus such that a distant position from the movable apparatus is included in the high-resolution area. Since an image away from the optical axis can be acquired with the optical system 1 with a high resolution and an image near the optical axis can be acquired with the optical system 2 with a high resolution, the optical axes may be disposed such that the high-resolution area is allocated to an area with high visibility after image deformation according to the system.

In addition, although calibration data is stored in advance in the storage unit 22 and image deformation and combining are performed based on the calibration data in the first embodiment, calibration data may not necessarily used. In this case, for example, an image may be deformed in real time according to a user operation to be adjusted in a desired deformation amount.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing system through a network or various storage media. Then, a computer (or a CPU, an MPU, or the like) of the image processing system may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

The present application claims interests of Japanese Patent Application No. 2022-10443 filed on Jan. 26, 2022, and No. 2023-000954 filed on Jan. 6, 2023. In addition, the contents of the Japanese Patent Applications described above are incorporated herein by reference in their entirety.

What is claimed is:

1. An image processing system comprising:
   a first optical system configured to form a first optical image having (1) a low-resolution area corresponding to an angle of view less than a first angle of view and (2) a high-resolution area corresponding to an angle of view greater than or equal to the first angle of view;
   a first imaging unit configured to capture the first optical image formed by the first optical system to generate first image data;
   one or more memories storing instructions; and
   one or more processors executing the instructions to deform the first image data to generate first deformed image data,
   wherein the following expression 1 is configured to be satisfied when $y1(\theta1)$ indicates a projection characteristic representing a relation between a half angle of view $\theta1$ of the first optical system and an image height $y1$ on an image plane, $\theta1max$ indicates a maximum half angle of view of the first optical system, $f1$ indicates a focal length of the first optical system, and A indicates a predetermined constant:

$$0.2 < \frac{2f1 \times \tan\left(\frac{\theta1_{max}}{2}\right)}{y1(\theta1_{max})} < A. \tag{1}$$

2. The image processing system according to claim 1, wherein the one or more processors further execute the instructions to transform coordinates in an image to generate a virtual viewpoint image taken from a virtual viewpoint.

3. The image processing system according to claim 1, further comprising:
   a second imaging unit that is different from the first imaging unit,
   wherein the one or more processors further execute the instructions to deform each piece of second image data generated from capturing by the second imaging unit and the first image data and then combine the data to generate a composite image.

4. The image processing system according to claim 3, wherein an imaging area of the first imaging unit and an imaging area of the second imaging unit are arranged to partly overlap each other.

5. The image processing system according to claim 3, further comprising:
   a second optical system configured to form a second optical image in the second imaging unit,
   wherein the second optical image has (1) a high-resolution area corresponding to an angle of view less than a second angle of view and (2) a low-resolution area corresponding to an angle of view greater than or equal to the second angle of view.

6. The image processing system according to claim 5, wherein, when a focal length of the second optical system is indicated by $f2$, a half angle of view is indicated by $\theta2$, an image height on an image plane is indicated by $y2$, and a projection characteristic representing a relation between the image height $y2$ and the half angle of view $\theta2$ is indicated by $y2(\theta2)$, $y2(\theta2)$ in the high-resolution area is greater than $f2\times\theta2$ and is different from the projection characteristics in the low-resolution area.

7. The image processing system according to claim 6, wherein the following expression 2 is configured to be satisfied when $y2(\theta2)$ indicates a projection characteristic representing a relation between the half angle of view $\theta2$ of the second optical system and the image height $y2$ on the image plane, $\theta2max$ indicates a maximum half angle of view of the second optical system, $f2$ indicates a focal length of the second optical system, and B indicates a predetermined constant:

$$1 < \frac{2f2 \times \sin\theta2_{max}}{y2(\theta2_{max})} \leq B. \tag{2}$$

8. A movable apparatus wherein the first imaging unit of the image processing system according to claim 1 is disposed on at least one side of a right side and a left side of the movable apparatus in an advancing direction.

9. A movable apparatus wherein the second imaging unit of the image processing system according to claim 3 is disposed on at least one side of a front side and a rear side of the movable apparatus in an advancing direction.

10. The movable apparatus according to claim 9, wherein the first imaging unit is disposed on at least one side of a right side and a left side of the movable apparatus in the advancing direction.

11. The movable apparatus according to claim 8, further comprising a display unit configured to display the first deformed image.

12. The movable apparatus according to claim 9, wherein the one or more processors further execute the instructions to control whether to generate a composite image by deforming each piece of the first image data and the second image data and then combine the data according to a movement state of the movable apparatus.

13. The movable apparatus according to claim 12, wherein the one or more processors further execute the instructions to deform each piece of the first image data and the second image data and then combine the data to generate a composite image in accordance with a movement speed of the movable apparatus being lower than a predetermined speed.

14. The movable apparatus according to claim 13, wherein the one or more processors further execute the instructions to process the second image data from the second imaging unit that captures the movable apparatus in the advancing direction and perform displaying processed second image data in accordance with the movement speed of the movable apparatus being higher than or equal to the predetermined speed.

15. An image processing method using an image processing system including (A) a first optical system configured to form a first optical image having (1) a low-resolution area corresponding to an angle of view less than a first angle of view and (2) a high-resolution area corresponding to an angle of view greater than or equal to the first angle of view, and (B) a first imaging unit configured to receive light of the first optical image formed by the first optical system, the image processing method comprising:
   capturing the first optical image to generate first image data; and
   deforming the first image data to generate deformed image data,
   wherein the following expression 1 is configured to be satisfied when $y1(\theta1)$ indicates a projection characteristic representing a relation between a half angle of view $\theta1$ of the first optical system and an image height $y1$ on an image plane, $\theta1max$ indicates a maximum half angle of view of the first optical system, f1 indicates a focal length of the first optical system, and A indicates a predetermined constant:

$$0.2 < \frac{2\left(1 \times \tan\left(\frac{\theta_{1max}}{2}\right)\right)}{y1(\theta_{1max})} < A. \quad (1)$$

16. A storage medium comprising a read-only memory, a disk drive, or a memory card, the storage medium storing a computer program for performing steps in a computer of an image processing system including (A) a first optical system configured to form a first optical image having (1) a low-resolution area corresponding to an angle of view less than a first angle of view and (2) a high-resolution area corresponding to an angle of view greater than or equal to the first angle of view and (B) a first imaging unit configured to receive light of the first optical image formed by the first optical system, the steps including:

capturing the first optical image to generate first image data, and deforming the first image data to generate deformed image data, wherein the following expression 1 is configured to be satisfied when $y1(\theta 1)$ indicates a projection characteristic representing a relation between a half angle of view $\theta 1$ of the first optical system and an image height $y1$ on an image plane, $\theta 1max$ indicates a maximum half angle of view of the first optical system, f1 indicates a focal length of the first optical system, and A indicates a predetermined constant:

$$0.2 < \frac{2\left(1 \times \tan\left(\frac{\theta_{1max}}{2}\right)\right)}{y1(\theta_{1max})} < A. \quad (1)$$

* * * * *